E. J. ROBERTS.
MOUNTING OF FEED GUIDES OF PRINTING, LITHOGRAPHING, AND OTHER LIKE MACHINES.
APPLICATION FILED SEPT. 13, 1916.
1,231,198.
Patented June 26, 1917.
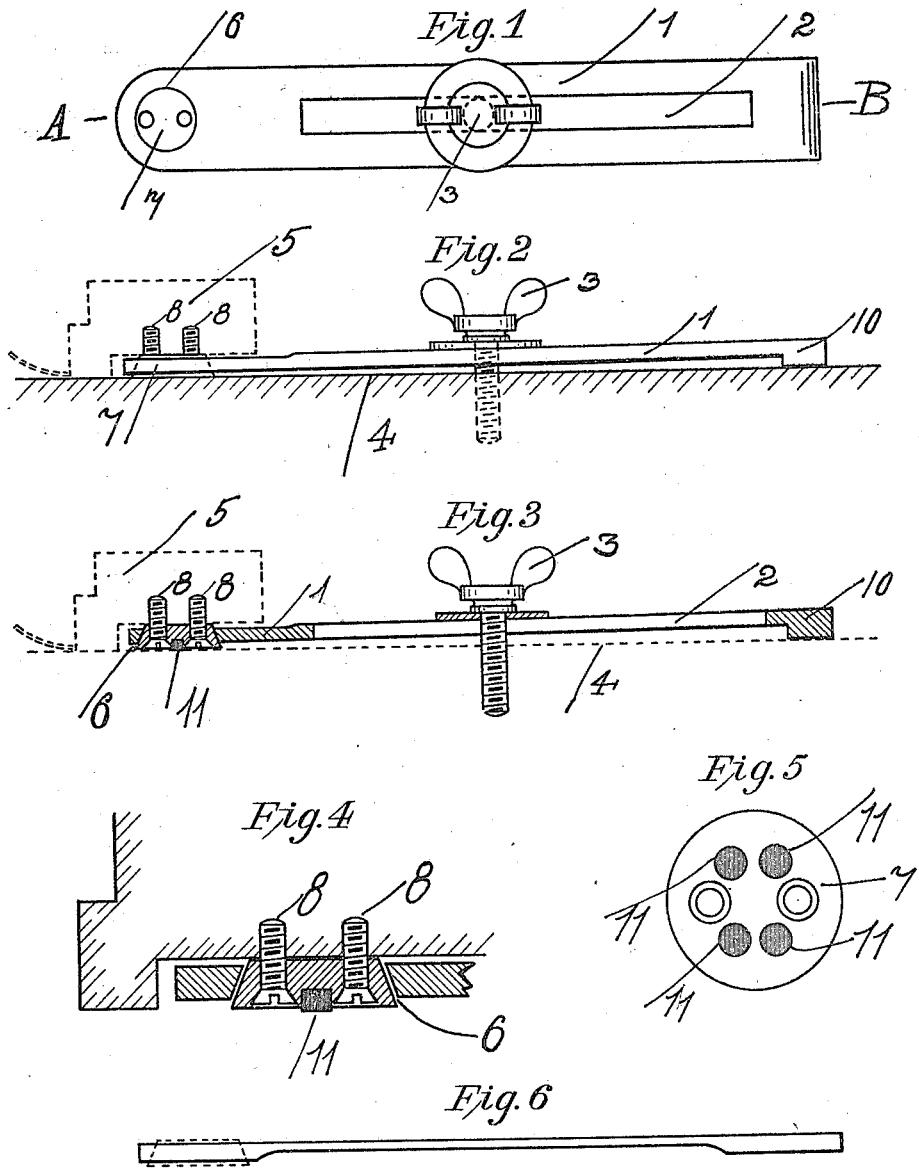

UNITED STATES PATENT OFFICE.

ERNEST JAMES ROBERTS, OF CHRISTCHURCH, NEW ZEALAND.

MOUNTING OF FEED-GUIDES OF PRINTING, LITHOGRAPHING, AND OTHER LIKE MACHINES.

1,231,198.   Specification of Letters Patent.   Patented June 26, 1917.

Application filed September 13, 1916. Serial No. 119,955.

*To all whom it may concern:*

*Improvements in and relating to the mounting of feed-guides of printing, lithographing, and other like machines.*

Be it known that I, ERNEST JAMES ROBERTS, 517 River road, borough of New Brighton, Christchurch, in the Province of Canterbury, Dominion of New Zealand, lithographer, do hereby declare the nature of this invention and in what manner the same is to be performed to be particularly described and ascertained in and by the following statement.

This invention relates to the mounting of feed guides of printing, lithographing and other like machines in which the paper is fed up to a guide.

As hitherto constructed these mountings have consisted of a slotted or perforated plate adapted to be clamped to the feed-board in the required position by means of a set-screw, while the guide itself has been locked in a similar manner to the said plate. By this construction however it has been necessary in squaring the guide to the edge of the paper, to first adjust the plate to the required position upon the feed-board and then to adjust and lock the guide itself by a subsequent operation.

It is the object of the present invention however to provide a construction in which the locking of the guide is effected automatically by the action of clamping the plate upon the feed-board, thus enabling the adjustment to be performed more quickly than heretofore and dispensing with the use of a second set-screw.

In order that the nature of the invention may be fully understood, reference will now be made to the accompanying sheet of drawings in which:—

Figure 1 is a plan view of the mounting with the guide removed.

Fig. 2 is a longitudinal elevation of the same in which the position of the guide is indicated in dotted lines.

Fig. 3 is a longitudinal section along the line A—B, Fig. 1.

Fig. 4 is an enlarged detail view illustrating the method of securing the guide to the plate, and Fig. 5 is an enlarged view showing the underside of the truncated cone 7 and the rubber studs 11.

Fig. 6 shows an alternative construction of the plate for that illustrated in Figs. 1, 2 and 3.

1 is a plate formed with a series of perforations or a longitudinal slot 2 through which passes a set-screw 3 by means of which such plate is clamped upon the feed-board 4, as customary.

According to the present invention, for the purpose of mounting the feed-guide 5, a hole 6 is formed through the plate 1, such hole being formed conical or tapering slightly toward the upper side of the plate. Inserted within the said hole 6 from the underside of the plate, is a similarly tapered disk or truncated cone 7, the base of which projects slightly beneath the undersurface of the plate as shown, while the upper or smaller end of such cone abuts with the bottom of the feed-guide 5 and to which it is rigidly secured in any suitable manner as by means of screws 8 as here shown.

According to the present invention also the plate 1 is so formed that the action of clamping it by means of the screw 3 will cause the base of the cone to bear down firmly upon the feed-board 4, and so lock the guide from turning. As shown in Figs. 1, 2, 3, this purpose is effected by forming upon the underside of the plate and at the end remote from the guide a block or projection 10 which serves to raise that end of the plate, thus causing the other end of such plate to rest solely upon the cone, while the intermediate portion of such plate will be clear of the board. As an alternative construction however the plate may be formed somewhat hollow in the middle of its underside, as shown in Fig. 6. In all cases however the portion of the upper surface of the plate beneath the guide is made parallel with the surface of the board in order to insure the guide assuming a level position.

In order to avoid the possibility of marking or indenting the board, the base of the cone may be provided with studs 11 of rubber or other suitable material, while to insure against its being accidentally turned when in use, the surface of the cone and its hole 6, are polished, or both may be suitably milled or roughened if thought necessary or desirable.

In operation the plate is first placed at the desired position upon the board and the guide turned into position as desired, the plate is then clamped down by means of the set-screw 3 thereby securing the plate, and also by the action of jamming the cone, locking the guide from further turning.

Having now particularly described and ascertained the nature of my said invention and in what manner the same is to be performed, I declare that what I claim is:—

Means for the purpose indicated comprising in combination with a plate adapted to be clamped upon the feed-board by means of a set-screw, feed guide, a truncated cone inserted from the underside of the plate in a conical hole, the smaller or upper end of such cone abutting with and being rigidly secured to the guide while the base of such cone projects slightly beneath the underside of the plate and forms a bearing for the latter upon the board, substantially as described.

Dated at Christchurch, this 14th day of August, 1916.

ERNEST JAMES ROBERTS.

Witnesses:
W. DALLEY,
A. C. MACINTYRE.

Copies of this patent may be obtained for five cents each, by addressing the "Commissioner of Patents, Washington, D. C."